US 8,074,210 B1

(12) United States Patent
Jones

(10) Patent No.: US 8,074,210 B1
(45) Date of Patent: Dec. 6, 2011

(54) METHOD AND APPARATUS FOR PRODUCING OPTIMIZED MATRIX TRIANGULATION ROUTINES

(75) Inventor: Ben Joseph Jones, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 1560 days.

(21) Appl. No.: 11/478,099

(22) Filed: Jun. 29, 2006

(51) Int. Cl.
G06F 9/45 (2006.01)

(52) U.S. Cl. ...................................................... 717/151

(58) Field of Classification Search .................. None
See application file for complete search history.

(56) References Cited

U.S. PATENT DOCUMENTS

| | | | | |
|---|---|---|---|---|
| 6,470,368 B1 * | 10/2002 | Garg et al. | ................ | 708/446 |
| 6,907,513 B2 * | 6/2005 | Nakanishi | ................ | 712/17 |
| 7,089,275 B2 * | 8/2006 | Garg | ................ | 708/446 |
| 7,752,607 B2 * | 7/2010 | Larab et al. | ................ | 717/135 |

OTHER PUBLICATIONS

Rothberg et al. "An Efficient Block-Oriented Approach to Parallel Sparse Cholesky Factorization", 1993, Supercomputing '93, pp. 503-512.*

Jay et al. "Exploring Shape in Parallel Programming", 1996, IEEE Second International Conference on Algorithms and Architectures for Parallel Processing, pp. 295-302.*

Lee et al. "Task Scheduling Using a Block Dependency DAG for Block-Oriented Sparse Cholesky Factorization", 2003, Parallel Computing, 29, 135-159.*

Yamamoto et al., "Performance Modeling and Optimal Block Size Selection for a BLAS-3 Based Tridiagonalization Algorithm", 2005, Proceedings of the Eighth International Conference on High-Performance Computing in Asia-Pacific Region.*

* cited by examiner

*Primary Examiner* — Lewis Bullock, Jr.
*Assistant Examiner* — Jue Wang
(74) *Attorney, Agent, or Firm* — Robert M. Brush; LeRoy D. Maunu

(57) ABSTRACT

Method, apparatus, and computer readable medium for producing an optimized matrix triangulation algorithm is described. In one example, tile functions are generated for a matrix triangulation problem. Cost data is measured for the tile functions with respect to a target architecture. The cost data is processed to identify optimal composition of tiles for rows in an iteration space of the matrix triangulation problem. The optimal compositions of tiles are processed to identify optimal composition of rows for triangles in the iteration space. A sequence of tile function invocation based on the optimal compositions of tiles and the optimal compositions of rows is generated.

19 Claims, 4 Drawing Sheets

METHOD AND APPARATUS FOR PRODUCING OPTIMIZED MATRIX TRIANGULATION ROUTINES

FIELD OF THE INVENTION

One or more aspects of the present invention relate generally to software optimization and, more particularly, to a method and apparatus for producing optimized matrix triangulation routines.

BACKGROUND OF THE INVENTION

There are many optimization techniques that can be applied to software programs to improve performance. Most optimizations take the form of a transformation or series of transformations of the program's structure to improve the exploitation of instruction-level parallelism and/or data locality. However, for a given program or algorithm, there are a myriad of possible transformations to choose from. Which of the possible transformations is best will depend heavily on the architecture of the target processor and the features of the target system's memory hierarchy (e.g., data cache). This means that many libraries of optimized software functions are not portable between different processor architectures, or even between members of the same central processor unit (CPU) family. Software code must often be re-optimized every time the target platform changes. Such optimizations are particularly important in the presence of deep pipelines, which are common when floating-point arithmetic is used. There has been much research into architecture-adaptive code optimization. One approach is to enhance the compiler with an accurate model of the target architecture so that the effects of different transformations can be predicted. In practice, such models are difficult to devise and even more difficult to maintain.

A common computation requirement in mobile communication systems based on MIMO (multiple-input, multiple-output) is to perform matrix triangulation, which is the process of reducing a matrix to a form in which the elements below the leading diagonal are zero. Matrix triangulation techniques are also employed in radar, sonar, and other beam-forming-related applications. There are several algorithms for matrix triangulation, including QR decomposition, singular-value decomposition, and Cholesky factorization. Each of these algorithms has several variant implementations, but a unifying feature is that the computational structure is triangular. Such a triangular structure results because once a matrix element has been reduced to zero, the element takes no further part in the calculations. Another common feature is a requirement for a wide dynamic range in the intermediate calculations. This makes floating-point number representation desirable, thereby increasing the importance of code optimization for achieving high performance.

Present approaches to obtaining high performance on matrix triangulation algorithms in software are either to hand-optimize the code for a specific architecture, or to attempt to model the architecture within a sophisticated compilation environment capable of performing directed loop transformation. The former approach is labor intensive and not future-proof; the latter is barely feasible given the current state of the art (such compilers do exist, but are either research projects or very expensive and/or domain-specific). While it is possible to design custom hardware to implement matrix triangulation algorithms, in most wireless systems the utilization would not be high enough to justify the costs of the custom hardware.

Accordingly, there exists a need in the art for a method and apparatus for producing optimized matrix triangulation routines.

SUMMARY OF THE INVENTION

Method, apparatus, and computer readable medium for producing an optimized matrix triangulation algorithm is described. In one embodiment, tile functions are generated for a matrix triangulation problem. Cost data is measured for the tile functions with respect to a target architecture. The cost data is processed to identify optimal composition of tiles for rows in an iteration space of the matrix triangulation problem. The optimal compositions of tiles are processed to identify optimal composition of rows for triangles in the iteration space. A sequence of tile function invocation based on the optimal compositions of tiles and the optimal compositions of rows is generated.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for producing optimized matrix triangulation algorithms is described. One or more aspects of the invention relate to automatically accelerating the execution of matrix triangulation algorithms on a microprocessor. The computation structure is decomposed into a number of "tile functions" of various sizes, to which local optimization techniques, such as software pipelining techniques, are applied. The tiles are individually profiled to assess their performance on the target processor architecture. A two-dimensional dynamic programming algorithm is used to find the optimal structure for re-composing the tiles to solve the requested problem. This technique allows one "self-optimizing" software library to adapt itself to many different processor architectures, cache layouts, and memory systems.

Figure 1:
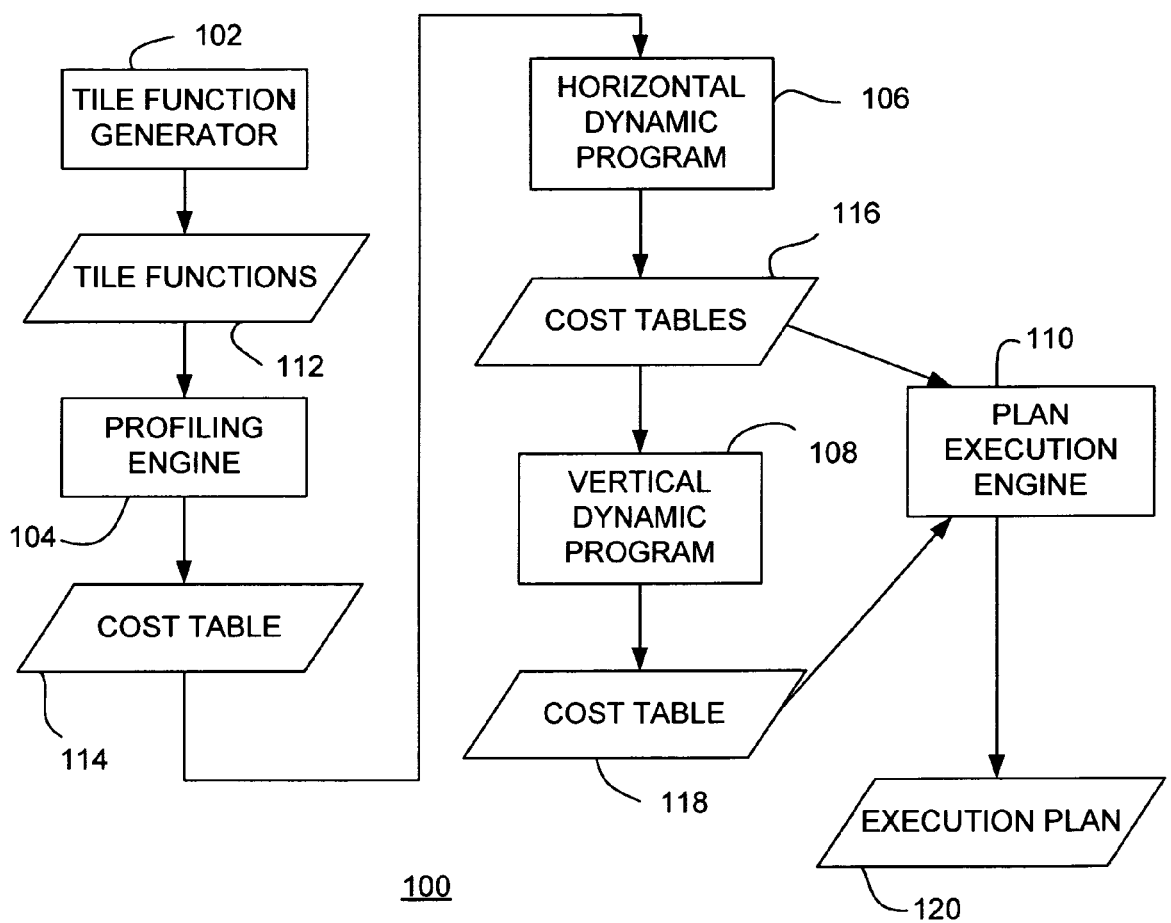
FIG. 1 is a block diagram depicting an exemplary embodiment of a system for producing optimized matrix triangulation routines in accordance with one or more aspects of the invention.

FIG. 1 is a block diagram depicting an exemplary embodiment of a system 100 for producing optimized matrix triangulation routines in accordance with one or more aspects of the invention. The system 100 includes a tile function generator 102, a profiling engine 104, a horizontal dynamic program module 106, a vertical dynamic program module 108, and a plan execution engine 110. The system 100 may be implemented using the computer 500 of FIG. 5 and described below. Notably, the elements of the system 100 may be part of one or more software programs stored in a memory and configured for execution by a central processing unit (CPU).

The tile function generator 102 is configured to produce locally-optimized tile functions from which the solution to a matrix triangulation problem of arbitrary size can be composed. As described below, a sequence of invocations of a group of these tile functions will be produced to perform an optimized matrix triangulation algorithm. "Tiling" or "blocking" is a process for re-ordering iterative computations of an algorithm. Instead of processing an entire array of data in multiple passes, the array is divided into tiles, where multiple passes are performed on tile #1, followed by multiple passes on tile #2 and so on. Thus, the iteration space of a matrix triangulation algorithm is divided into tiles. Each of the tile functions produced by the tile function generator 102 is configured to process a tile in the iteration space of a matrix triangulation algorithm.

In one embodiment, the matrix triangulation algorithm comprises a OR decomposition algorithm. As is well known in the art, a OR decomposition of a matrix is a decomposition of the matrix into an orthogonal matrix and a triangular matrix. In particular, a QR decomposition of a real square matrix A is a decomposition of A as:

$$A=QR,$$

where Q is an orthogonal matrix (meaning that $Q^T Q=I$) and R is an upper triangular matrix. More generally, an m×n matrix (with $m \geq n$) of full rank can be factored as the product of an m×n unitary matrix and an n×n upper triangular matrix. The factorization is unique if the diagonal elements of R are required to be positive. One process for computing a QR decomposition of a matrix involves the use of Givens rotations or squared Givens rotations. Each rotation zeros an element in the sub-diagonal of the matrix, forming the R matrix. The concatenation of all Givens rotations forms the orthogonal Q matrix.

The following is exemplary pseudocode for a OR decomposition algorithm of a matrix X into a matrix R:

For each k from 1 to K, do:
    For each j from 1 to N, do:
    [R(j,j), angle]=Vectorize (R(j,j), X(k,j));
    For each i from j to N, do:
        [R(j,i), X(k,i)]=Rotate(R(j,i), X(k,i), angle);
    End
    End
End In the above pseudocode, N is the number of columns in the X matrix, K is the number of rows in the X matrix, k counts the complete Givens rotations (rows of X), j counts down rows of R, and i counts along each row of R. The Vectorize and Rotate functions perform the actual Givens rotation computations, which are well known in the art. As such, the details of such functions and their computations are omitted for clarity. For present purposes, what is important in the above algorithm is the iteration space formed by the three for loops. The inner two for loops having the j and i indexes form a triangular iteration space. The outer for loop having the index k dictates the number of passes over this triangular iteration space.

Figure 2:
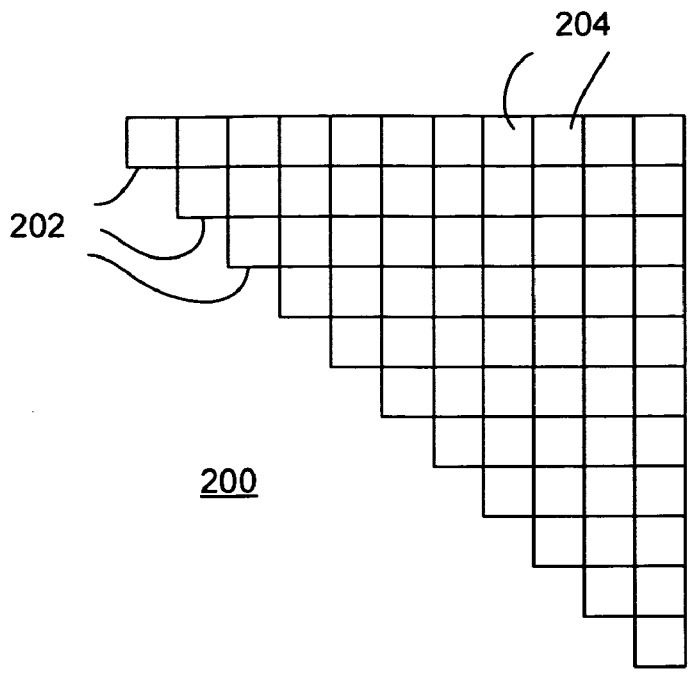
FIG. 2 illustrates an exemplary triangular iteration space for a matrix triangulation algorithm.

FIG. 2 illustrates an exemplary triangular iteration space 200. With respect to the pseudocode above, for the triangular iteration space 200, the index j ranges from 1 to 11 (i.e., there are 11 rows of R). Each of the edge blocks 202 represents an iteration where the Vectorize function is called. Each of the inner blocks 204 represents an iteration where the Rotate function is called. In the pseudocode version of the QR algorithm above, the computations proceed in order across each row of the triangular iteration space 200. This sequence of computations is repeated K times.

Figure 3:
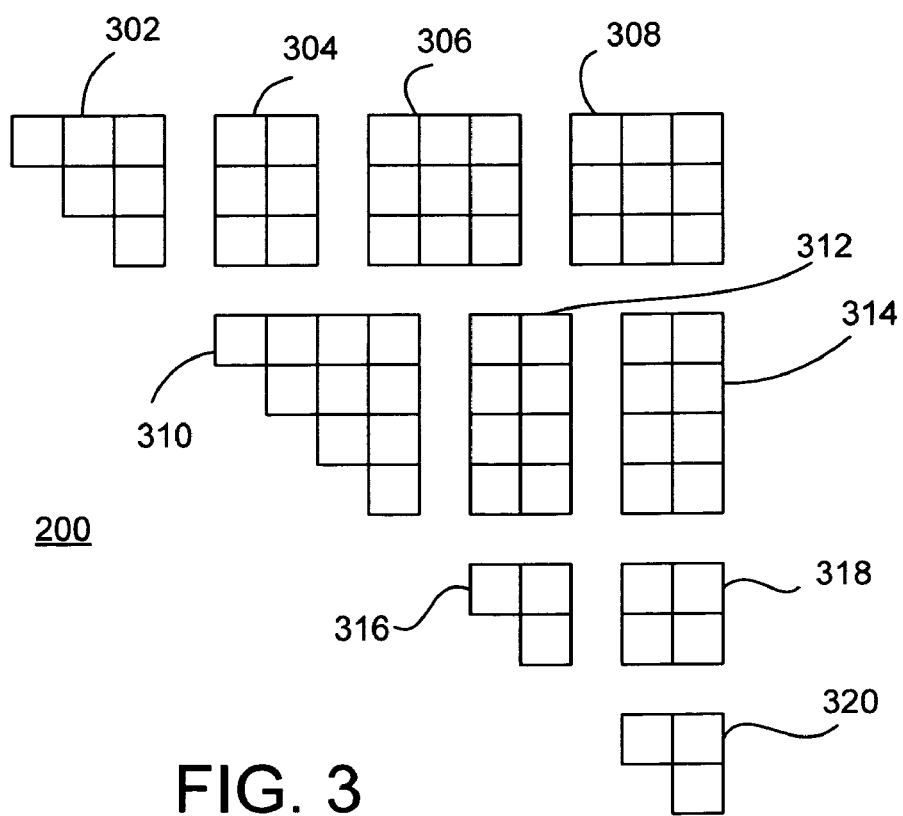
FIG. 3 illustrates an exemplary embodiment of the triangular iteration space of FIG. 2 divided into tiles in accordance with one or more aspects of the invention.

FIG. 3 illustrates an exemplary embodiment of the triangular iteration space 200 of FIG. 2 divided into tiles in accordance with one or more aspects of the invention. In the present embodiment, the triangular iteration space 200 is divided into tiles 302 through 320. The tiles are shown separated for clarity. Each of the tiles 302 through 320 includes a height and a width. For example, the tile 304 has a height of three and a width of two. Some of the tiles 302 through 320 are rectangular tiles (e.g., the tile 304). The tiles at the boundary of the triangular iteration space 200 are triangular tiles (e.g., the tile 302). The width of a triangular tile is equal to the height. For example, the tile 302 has a height and width of three. For a given tile, the computations proceed across each row from row to row. This sequence of computations is repeated K times for the same tile. The process is then repeated for each tile from tile to tile. The sizes and organization of the tiles 302 through 320 are merely illustrative for the purposes of describing the tiling process and are not meant to provide an optimal solution to the QR algorithm described above. As used herein, shapes are defined with respect to the iteration space (e.g., rows, triangles, etc.). Thus, the term "row" means a row in the iteration space.

Returning to FIG. 1, there are two classes of tile functions: boundary tiles and internal tiles. Boundary tiles have a triangular shape in iteration space. Internal tiles have a rectangular shape in iteration space. The tile functions are generated automatically given the particular matrix triangulation problem. The tile functions are locally optimized using various optimization techniques, such as software pipelining techniques.

The re-ordering of iterative computations often results in a more efficient execution of the algorithm because the results of computations in earlier iterations are re-used in later iterations. By tiling, intermediate results can be stored locally (i.e., in cache or in the register file of a processor). Without tiling, the intermediate results will be repeatedly written to memory and read back, which will cause the execution of the algorithm to be less efficient. The area of a tile is directly proportional to the number of computations (and hence processor instructions) required to be executed for that portion of the task. Thus, a 2×3 tile entails the same amount of computation as a 3×2 tile and a 1×6 tile.

However, different tile sizes may provide different levels of performance. Notably, each distinct tile will expose a different amount of locality and a different amount of parallelism. In general, there is usually a tradeoff: small tiles will have very good locality, but less parallelism; larger tiles will have more parallelism, but poorer locality. How exactly these properties interact to yield the bottom line performance for a tile depends on various characteristics of the target CPU architecture. Such characteristics include absolute latency of operations, relative pipeline latencies, number of registers, pipeline bypassing/forwarding, cache size, cache associatively, cache latency, cache miss penalty, and the like.

Due to the large number of variables that affect performance, it is difficult to model and predict the performance of the various tiles. This is a particular problem for re-usable libraries, where the target hardware may not be known (or even invented). As such, in accordance with one aspect of the invention, the tile functions generated by the tile function generator are "self-tuned", whereby the performance of each tile function is measured directly with respect to a particular architecture. The tile function generator 102 generates a table 112 of tile functions as output. The profiling engine 104 is configured to receive the table 112. The profiling engine 112 measures the execution time of each tile function in turn, in order to build a machine-specific cost table 114 for the tile functions. Depending on the characteristics of the target architecture, some tile functions will perform better than other tile functions. The shape of the optimum tile function will depend on the relative and absolute latencies of instructions, the number of registers available, and the details of the machine's memory hierarchy (amount and organization of cache memory). The profiling engine 112 calculates a cost for each tile function and provides the cost table 114 as output.

In general, the problem of how to compose the individually costed sub-problems (tile functions) into a solution for the problem as a whole is NP-complete (non-polynomial complete). By recognizing that the storage requirement is reduced if the computation proceeds row-by-row, the general problem can be reduced to two simpler problems. Namely, finding the most efficient row computation patterns, and finding the most efficient way to compose these to solve the whole problem. Both of these sub-problem dimensions are essentially integer knapsack problems that can be solved in polynomial time by means of dynamic programming.

The horizontal dynamic program module 106 is configured to receive the cost table 114. The horizontal dynamic program module 106 and the vertical dynamic program module 108 implement a two-dimensional dynamic programming algorithm. The tile functions are divided into sets according to their height. For each set of tile functions, the horizontal dynamic program module 106 determines the optimal composition of tiles for every row size up to a specified maximum (configurable) row size. The horizontal dynamic program module 106 produces a plurality of cost tables 116 as output (one cost table for each set of tile functions). The vertical dynamic program module 108 is configured to receive the cost tables 116. The vertical dynamic program module 108 uses the cost tables 116 to determine the optimal composition of rows for every problem size up to a specified maximum (configurable). The vertical dynamic program module 108 produces a cost table 118 as output.

The horizontal dynamic program module 106 treats each application tile function as a "solved" problem for the smallest row possible. The horizontal dynamic program module 106 then uses a brute-force substitution approach to reduce the smallest available "unsolved" problem to one of the "solved" problems by adding one tile function. This method is applied recursively, expanding the set of "solved" row-tiling problems at each stage. The execution time of each stage is linear in the number of tile functions available (which is small), and each stage involves integer computations.

Likewise, the vertical dynamic program module 108 treats each applicable row solution (from the horizontal dynamic program module 106) as a "solved" problem for the smallest triangle possible. It then uses the same substitution approach to reduce the "unsolved" problems to "solved" problems by adding one row solution. This way, the optimal tiling pattern for all possible triangles (up to the specified maximum problem size) can be found. It is trivial to show that the number of steps needed to find all these solutions is approximately equal to the maximum problem size multiplied by the number of tile functions. The low cost of the optimization algorithm makes dynamic (run-time) re-profiling at attractive possibility.

The plan execution engine 110 is configured to receive the cost tables 116 and the cost table 118 as input. The plan execution engine 110 generates an execution plan 120 as output. The execution plan 120 includes a sequence of tile function invocations that can be executed to perform the optimized matrix triangulation algorithm. The execution plan 120 is generated from the cost tables 116 and the cost table 118. In one embodiment, the plan execution engine 110 produces a computation kernel. The execution of the tiling plan can be either via interpretation or by re-compilation. For interpretation, the pattern is stored in an array that is read out at run-time by the execution engine 110. For re-compilation, the pattern is read out at compile time to create a custom computation kernel, which is then compiled and linked into the final application. The interpretive approach incurs some additional overhead, but allows the problem size to be varied dynamically. The re-compilation approach results in faster code (since all function calls are statically known), but requires re-compilation whenever a new problem size is encountered. Run-length encoding of the execution plan 120 results in a reduction in memory requirements in the interpretation case, or a reduction in code size in the re-compilation case.

Figure 4:
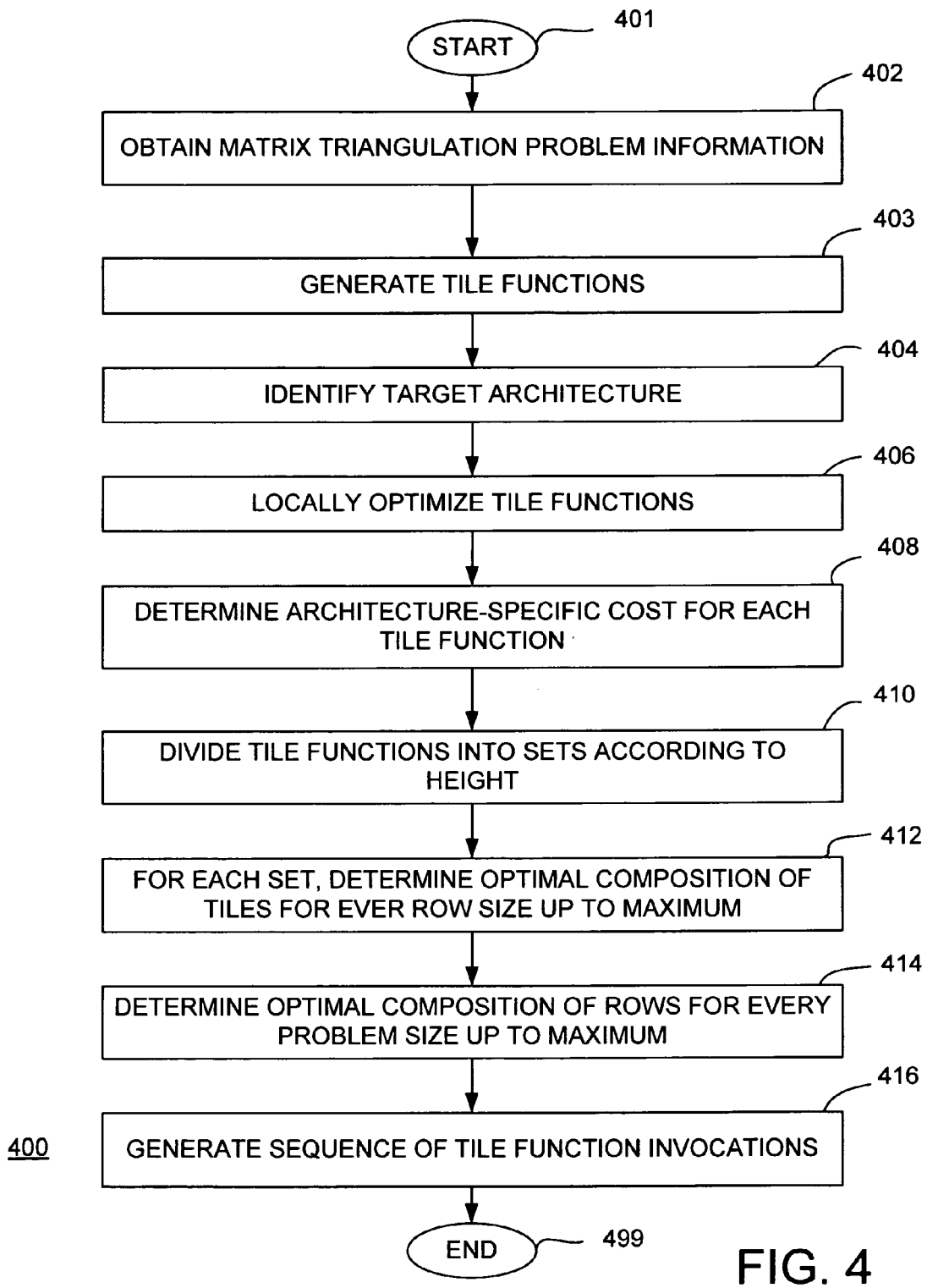
FIG. 4 is a flow diagram depicting an exemplary embodiment of a method for producing an optimized matrix triangulation algorithm in accordance with one or more aspects of the invention.

FIG. 4 is a flow diagram depicting an exemplary embodiment of a method 400 for producing an optimized matrix triangulation algorithm in accordance with one or more aspects of the invention. The method 400 begins at step 401. At step 402, matrix triangulation problem information is received. Such information may include, for example, the maximum size of the problem (i.e., the size of the input matrix) and the algorithm to be used (e.g., QR decomposition). At step 403, tile functions are generated based on the matrix triangulation problem information. At step 404, the target architecture is identified. Aspects of the target architecture identified may include, for example, relative and absolute latency of instructions in the processor, the number of registers available in the processor, and the amount and organization of cache memory in the processor (e.g., the amount of L1 and/or L2 cache).

At step 406, the tile functions are locally optimized for the target architecture. The tile functions can be locally optimized for the target architecture using various optimization techniques, such as software pipelining techniques. At step 408, an architecture-specific cost for each tile function is measured based on the target architecture. In one embodiment, the cost for each of the tile functions is based on a minimum, a maximum, or an average execution time requirement of said functions when executed on a processor in the target architecture. At step 410, the tile functions are divided into sets according to height in the iteration space. At step 412, for each set of tile functions, an optimal composition of tile functions is determined for every row size in iteration space up to a maximum size. The maximum size may be a default size, a configured size, or a size based on the problem information. In one embodiment, the cost data produced at step 408 is processed to identify optimal compositions of tiles for rows in iteration space. Each of the optimal compositions is associated with one of the sets (i.e., a set of optimal compositions is associated with each set of tile functions).

At step 414, an optimal composition of rows for every problem size in iteration space is determined up to a maximum. In one embodiment, the optimal compositions of tiles produced at step 412 are processed to identify optimal compositions of rows for triangles in the iteration space. At step 416, a sequence of tile function invocations is generated based on the optimization data produced from steps 412 and 414. The sequence of tile function invocations is based on the optimal compositions of tiles and the optimal compositions of rows produced in steps 412 and 414. In one embodiment, the sequence of tile functions is stored in an array and the tile function invocations are executed from the array at run-time.

In another embodiment, a compiled kernel is generated from the sequence of tile function invocations. The method 400 ends at step 499.

Figure 5:
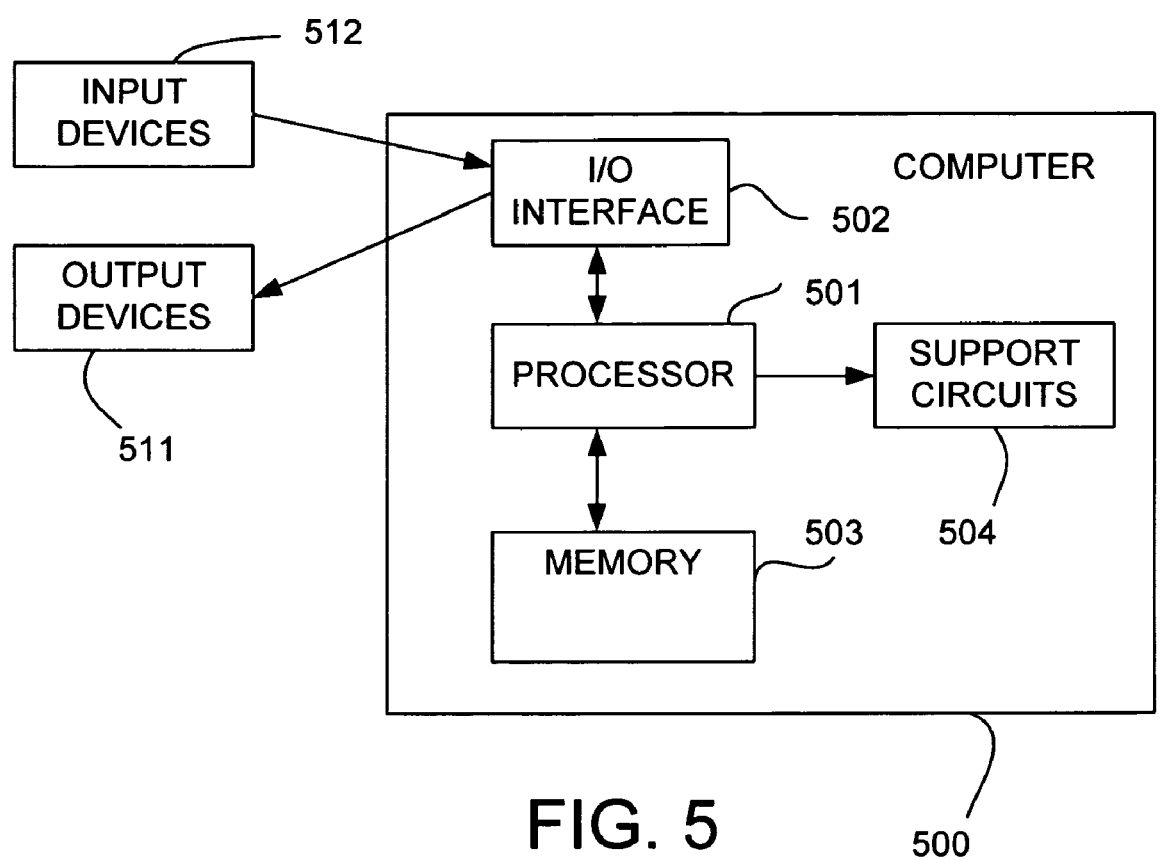
FIG. 5 is a block diagram depicting an exemplary embodiment of a computer suitable for implementing the processes and methods described herein.

FIG. 5 is a block diagram depicting an exemplary embodiment of a computer 500 suitable for implementing the processes and methods described herein. For example, the computer 500 may be used to implement the system 100 of FIG. 1, as well as the method 400 of FIG. 4. The computer 500 includes a processor 501, a memory 503, various support circuits 504, and an I/O interface 502. The processor 501 may be any type of microprocessor known in the art. The support circuits 504 for the processor 501 include conventional cache, power supplies, clock circuits, data registers, I/O interfaces, and the like. The I/O interface 502 may be directly coupled to the memory 503 or coupled through the processor 501. The I/O interface 502 may be coupled to various input devices 512 and output devices 511, such as a conventional keyboard, mouse, printer, display, and the like.

The memory 503 stores all or portions of one or more programs and/or data to implement the system 100 and the method 400 described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

Method and apparatus for producing optimized matrix triangulation algorithms has been described. One or more aspects of the invention apply optimization techniques of iteration-space tiling and software pipelining to the matrix triangulation problem in an architecture-adaptive context. Using the method of QR decomposition by Givens rotations (or squared Givens rotations) as a starting point, a self-optimizing matrix triangulation library is provided. A small number of software-pipelined tile functions (e.g., approximately 25) are generated automatically, and the library provides a facility to measure the performance of each tile function on the target hardware. The profiling results are then used in a novel two-dimensional dynamic programming algorithm, which determines the optimal combination of tile functions to use to solve a triangulation problem of a given size. The library handles the building and execution of an execution plan automatically. In one embodiment, the invention may provide a C programming interface or other language-type interface for the application programmer.

Builders of advanced wireless communication systems, for example, can make use of this library to achieve high-performance matrix triangulation without having to buy an expensive compiler or hand-optimize code for a particular CPU. Their applications will not only execute more efficiently, but the self-tuning nature of the library will ensure that even if the processor or system architecture is changed—particularly likely when a field programmable gate array (FPGA)-based solution is employed—their code will not need modifying to maintain its level of performance.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method of producing an optimized matrix triangulation algorithm, comprising:
   generating, by a processor, tile functions for a matrix triangulation problem;
   wherein one or more of the tile functions has a triangular shape, and one or more of the tile functions has a rectangular shape;
   measuring cost data for the tile functions with respect to a target architecture;
   wherein the cost data include cost data for tile functions having a triangular shape and cost data for tile functions having a rectangular shape;
   processing the cost data to identify optimal compositions of tiles for rows in an iteration space of the matrix triangulation problem;
   wherein the processing of the cost data includes, dividing the tile functions into sets of tile functions of equal height, and for each of the sets, determining an optimal composition of tiles for every row size up to a maximum row size:
   processing the optimal compositions of tiles to identify optimal compositions of rows for triangles in the iteration space;
   wherein the processing of the optimal compositions includes determining the optimal compositions of rows using costs of the sets of tile functions; and
   generating a sequence of tile function invocations based on the optimal compositions of tiles and the optimal compositions of rows.

2. The method of claim 1, wherein the tile functions are locally optimized with respect to the target architecture.

3. The method of claim 1, wherein the step of measuring comprises:
   computing a cost for each of the tile functions based on a minimum, a maximum, or an average execution time requirement of said functions when executed on a processor in the target architecture.

4. The method of claim 1, wherein the step of processing the cost data comprises:
dividing the tile functions into sets according to height in the iteration space;
wherein each of the optimal compositions of tiles is associated with one of the sets.

5. The method of claim 1, further comprising:
storing the sequence of tile function invocations in an array; and
executing tile function invocations from the array at run-time.

6. The method of claim 1, further comprising:
generating a compiled kernel from the sequence of tile function invocations.

7. The method of claim 1, wherein
the step of processing the cost data includes
generating the costs associated with the sets of tile functions.

8. Apparatus for producing an optimized matrix triangulation algorithm, comprising:
a processor;
a memory coupled to the processor, wherein the memory is configured with instructions that when executed by the processor cause the processor to perform operations including:
generating tile functions for a matrix triangulation problem;
wherein one or more of the tile functions has a triangular shape, and one or more of the tile functions has a rectangular shape;
measuring cost data for the tile functions with respect to a target architecture;
wherein the cost data include cost data for tile functions having a triangular shape and cost data for tile functions having a rectangular shape;
processing the cost data to identify optimal compositions of tiles for rows in an iteration space of the matrix triangulation problem;
wherein the processing of the cost data includes, dividing the tile functions into sets of tile functions of equal height, and for each of the sets, determining an optimal composition of tiles for every row size up to a maximum row size;
processing the optimal compositions of tiles to identify optimal compositions of rows for triangles in the iteration space;
wherein the processing of the optimal compositions includes determining the optimal compositions of rows using costs of the sets of tile functions; and
generating a sequence of tile function invocations based on the optimal compositions of tiles and the optimal compositions of rows.

9. The apparatus of claim 8, wherein the tile functions are locally optimized with respect to the target architecture.

10. The apparatus of claim 8, wherein the operations further include:
computing a cost for each of the tile functions based on a minimum, a maximum, or an average execution time requirement of said functions when executed on a processor in the target architecture.

11. The apparatus of claim 8, wherein the operations further include:
dividing the tile functions into sets according to height in the iteration space;
wherein each of the optimal compositions of tiles is associated with one of the sets.

12. The apparatus of claim 8, wherein the operations further include:
storing the sequence of tile function invocations in an array; and
executing tile function invocations from the array at run-time.

13. The apparatus of claim 8, wherein the operations further include:
generating a compiled kernel from the sequence of tile function invocations.

14. An article of manufacture, comprising:
a non-transitory computer readable medium having stored thereon software for producing an optimized matrix triangulation algorithm, comprising:
code for generating tile functions for a matrix triangulation problem;
wherein one or more of the tile functions has a triangular shape, and one or more of the tile functions has a rectangular shape;
code for measuring cost data for the tile functions with respect to a target architecture;
wherein the cost data include cost data for tile functions having a triangular shape and cost data for tile functions having a rectangular shape;
code for processing the cost data to identify optimal compositions of tiles for rows in an iteration space of the matrix triangulation problem;
wherein the processing of the cost data includes, dividing the tile functions into sets of tile functions of equal height, and for each of the sets, determining an optimal composition of tiles for every row size up to a maximum row size;
code for processing the optimal compositions of tiles to identify optimal compositions of rows for triangles in the iteration space;
wherein the processing of the optimal compositions includes determining the optimal compositions of rows using costs of the sets of tile functions; and
code for generating a sequence of tile function invocations based on the optimal compositions of tiles and the optimal compositions of rows.

15. The article of manufacture of claim 14, wherein the tile functions are locally optimized with respect to the target architecture, and wherein each of the tile functions has either a triangular shape in the iteration space or a rectangular shape in the iteration space.

16. The article of manufacture of claim 14, wherein the code for measuring comprises:
code for computing a cost for each of the tile functions based on a minimum, a maximum, or an average execution time requirement of said functions when executed on a processor in the target architecture.

17. The article of manufacture of claim 14, wherein the code for processing the cost data comprises:
code for dividing the tile functions into sets according to height in the iteration space;
wherein each of the optimal compositions of tiles is associated with one of the sets.

18. The article of manufacture of claim 14, further comprising:
code for storing the sequence of tile function invocations in an array; and
code for executing tile function invocations from the array at run-time.

19. The article of manufacture of claim 14, further comprising:
code for generating a compiled kernel from the sequence of tile function invocations.

* * * * *